US012167200B2

(12) United States Patent
Pinto

(10) Patent No.: US 12,167,200 B2
(45) Date of Patent: Dec. 10, 2024

(54) HEARING DEVICE WITH SHIELDING ANTENNA

(71) Applicant: GN Hearing A/S, Ballerup (DK)

(72) Inventor: Alexandre Da Luz Pinto, Copenhagen (DK)

(73) Assignee: GN HEARING A/S, Ballerup (DK)

( * ) Notice: Subject to any disclaimer, the term of this patent is extended or adjusted under 35 U.S.C. 154(b) by 125 days.

(21) Appl. No.: 17/856,931

(22) Filed: Jul. 1, 2022

(65) Prior Publication Data

US 2023/0007409 A1 Jan. 5, 2023

(30) Foreign Application Priority Data

Jul. 2, 2021 (DK) .......................... PA 2021 70351

(51) Int. Cl.

| | |
|---|---|
| ***H04R 25/00*** | (2006.01) |
| ***H01Q 1/27*** | (2006.01) |
| ***H01Q 1/52*** | (2006.01) |
| ***H01Q 7/00*** | (2006.01) |

(52) U.S. Cl.
CPC ............ *H04R 25/55* (2013.01); *H01Q 1/273* (2013.01); *H01Q 1/521* (2013.01); *H01Q 7/00* (2013.01); *H04R 2225/51* (2013.01)

(58) Field of Classification Search
None
See application file for complete search history.

(56) References Cited

U.S. PATENT DOCUMENTS

| | | | | |
|---|---|---|---|---|
| 10,231,063 | B2 * | 3/2019 | Nikles | H04R 25/65 |
| 2019/0006757 | A1 | 1/2019 | Nikles et al. | |
| 2020/0178006 | A1 * | 6/2020 | Özden | H04R 25/60 |
| 2020/0178007 | A1 * | 6/2020 | Ruaro | H04B 5/26 |
| 2020/0252735 | A1 * | 8/2020 | Meier | H04R 25/554 |

FOREIGN PATENT DOCUMENTS

| | | |
|---|---|---|
| DK | 181388 B1 | 9/2023 |
| EP | 3 343 953 A1 | 7/2018 |
| EP | 3 343 955 A1 | 7/2018 |
| EP | 3661231 | 6/2020 |
| EP | 3806493 | 4/2021 |

OTHER PUBLICATIONS

Extended European Search Report for EP Patent Appln. No. 22182298.4 dated Nov. 29, 2022.

(Continued)

*Primary Examiner* — Paul W Huber
(74) *Attorney, Agent, or Firm* — Vista IP Law Group, LLP

(57) ABSTRACT

A hearing device is disclosed. The hearing device comprises a plurality of antennas. The hearing device comprises electronic components including a first electronic component. The plurality of antennas comprises a first antenna and a second antenna. The first antenna may comprise a coil part coiled along a first antenna axis. The first antenna may be configured for magnetic induction communication. The second antenna may be configured for communication in a frequency band in the GHz range. The second antenna may comprise a shielding part configured to shield the first antenna.

17 Claims, 9 Drawing Sheets

(56) References Cited

OTHER PUBLICATIONS

1st Technical Examination for Danish Patent Appln. No. PA 2021 70351 dated Sep. 23, 2021.
2nd Technical Examination for Danish Patent Appln. No. PA 2021 70351 dated Apr. 25, 2022.
3rd Technical Examination for Danish Patent Appln. No. PA 2021 70351 dated Mar. 2, 2023.
4th Technical Examination for Danish Patent Appln. No. PA 2021 70351 dated May 30, 2023.
5th Technical Examination for Danish Patent Appln. No. PA 2021 70351 dated Jul. 17, 2023.

* cited by examiner

HEARING DEVICE WITH SHIELDING ANTENNA

RELATED APPLICATION DATA

This application claims priority to, and the benefit of, Danish Patent Application No. PA 2021 70351 filed on Jul. 2, 2021. The entire disclosure of the above application is expressly incorporated by reference herein.

FIELD

The present disclosure relates to a hearing device with shielding antenna.

BACKGROUND

Hearing devices include hearing instruments, such as hearing aids and/or earbuds.

Hearing devices are miniature devices. However, hearing devices comprise many electronic components contained in a housing or a shell of the hearing device. The hearing needs to be sufficiently small to fit in an ear canal of a user or be located behind an outer ear of a user. This leads spatial constraints when designing antennas to be used in hearing devices for wireless communication. However, antennas need also to perform well under spatial constraints.

SUMMARY

There is electro-magnetic interference observed at an antenna and coming from other electronic components. The electro-magnetic interference is detrimental to the antenna configured for magnetic induction communication.

Accordingly, there is a need for hearing devices with improved shielding of the antenna configured for magnetic induction communication against the electro-magnetic interference.

A hearing device is disclosed. The hearing device comprises a plurality of antennas. The hearing device comprises electronic components including a first electronic component. The plurality of antennas comprises a first antenna and a second antenna. The first antenna may comprise a coil part coiled along a first antenna axis. The first antenna may be configured for magnetic induction communication. The second antenna may be configured for communication in a frequency band in the GHz range. The second antenna may comprise a shielding part configured to shield the first antenna.

It is an advantage of the hearing device that the electro-magnetic interference is reduced. The present disclosure allows for improved shielding of the first antenna against electro-magnetic interference or noise source from other systems despite the spatial constraints.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
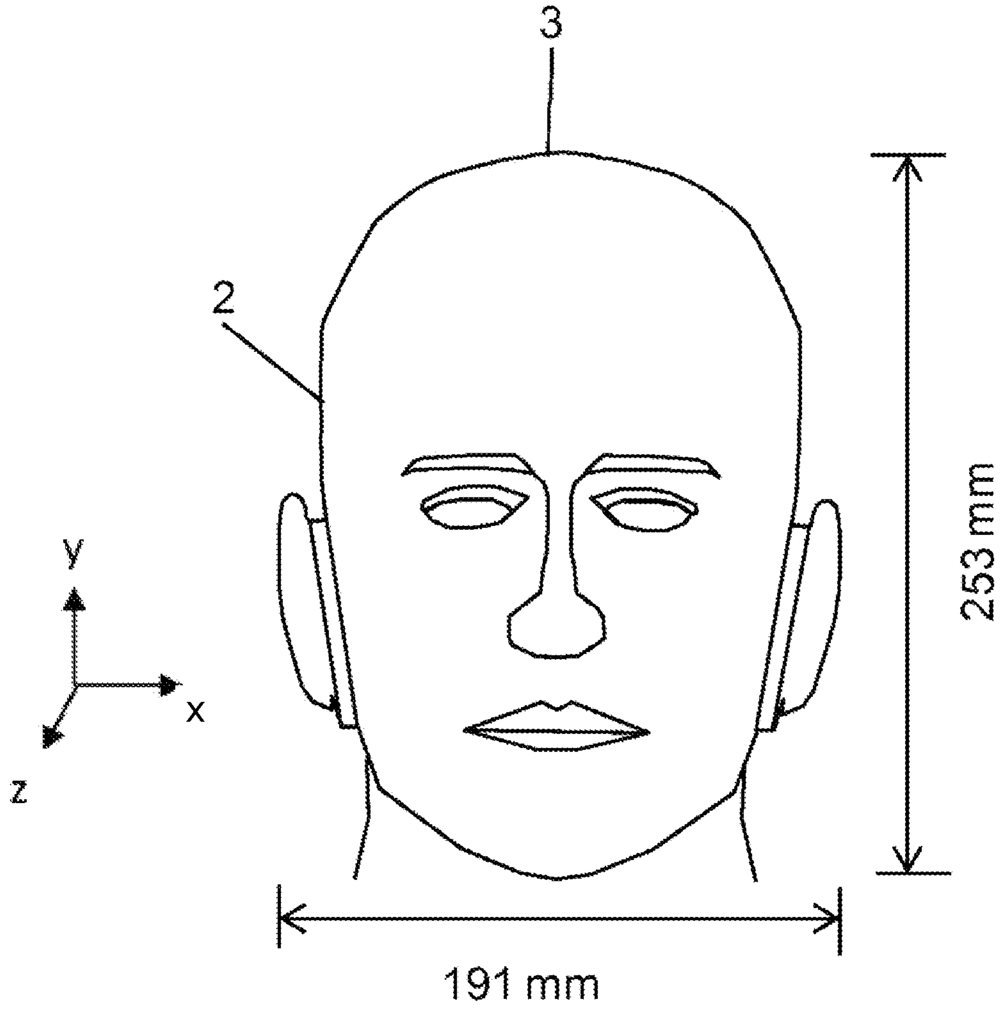
FIG. 1 schematically illustrates a phantom head model of a user, and a three dimensional coordinate system with an x, y, and z axis.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

A hearing device is disclosed. The hearing device may be configured to be worn at an ear of a user and may be a hearable or a hearing aid. The hearing device comprises a processor, wherein the processor is configured to compensate for a hearing loss of a user.

The hearing device may be of the behind-the-ear (BTE) type, in-the-ear (ITE) type, in-the-canal (ITC) type, receiver-in-canal (RIC) type, receiver-in-the-ear (RITE) type or completely in the canal (CIC) type. The hearing aid may be a binaural hearing aid. The hearing device may comprise a first earpiece and a second earpiece, wherein the first earpiece and/or the second earpiece is an earpiece as disclosed herein.

The hearing device may be configured for wireless communication with one or more devices, such as with another hearing device, e.g. as part of a binaural hearing system, and/or with one or more accessory devices, such as a smartphone and/or a smart watch. The hearing device optionally comprises a first antenna and a second antenna. Any of the antennas may be configured to convert one or more wireless input signals, e.g. a first wireless input signal and/or a second wireless input signal, to antenna output signal(s). The wireless input signal(s) may origin from external source(s), such as spouse microphone device(s), wireless TV audio transmitter, and/or a distributed microphone array associated with a wireless transmitter. The wireless input signal(s) may origin from another hearing device, e.g. as part of a binaural hearing system, and/or from one or more accessory devices.

The hearing device optionally comprises a radio transceiver coupled to the first antenna and/or the second antenna.

The radio transceiver may be configured to convert the antenna output signal to a transceiver input signal. Wireless signals from different external sources may be multiplexed in the radio transceiver to a transceiver input signal or provided as separate transceiver input signals on separate transceiver output terminals of the radio transceiver. The hearing device may comprise a plurality of antennas and/or an antenna may be configured to be operate in one or a plurality of antenna modes. The transceiver input signal optionally comprises a first transceiver input signal representative of the first wireless signal from a first external source.

The hearing device comprises a set of microphones. The set of microphones may comprise one or more microphones. The set of microphones comprises a first microphone for provision of a first microphone input signal and/or a second microphone for provision of a second microphone input signal. The set of microphones may comprise N microphones for provision of N microphone signals, wherein N is an integer in the range from 1 to 10. In one or more exemplary hearing devices, the number N of microphones is two, three, four, five or more. The set of microphones may comprise a third microphone for provision of a third microphone input signal.

The hearing device comprises a processor for processing input signals, such as transceiver input signal(s) and/or microphone input signal(s). The processor is optionally configured to compensate for hearing loss of a user of the hearing device. The processor may be connected to the radio transceiver for processing the transceiver input signal. The processor may be connected the first microphone for processing the first microphone input signal. The processor may be connected the second microphone if present for processing the second microphone input signal. The processor may comprise one or more A/D-converters for converting analog microphone input signal(s) to digital pre-processed microphone input signal(s).

The processor provides an electrical output signal based on the input signals to the processor. Input terminal(s) of the processor are optionally connected to respective output terminals of the pre-processing unit. For example, a transceiver input terminal of the processor may be connected to a transceiver output terminal of the transceiver. One or more microphone input terminals of the processor may be connected to respective one or more microphone output terminals of the one or more microphones.

The hearing device comprises a plurality of antennas. The hearing device comprises electronic components including a first electronic component. The plurality of antennas comprises a first antenna and a second antenna. The first antenna may comprise a coil part coiled along a first antenna axis. The first antenna may be configured for magnetic induction communication. Magnetic induction communication provides communication in a range of frequencies between 3 MHz and 30 MHz. The first antenna provides the electromagnetic radiation that propagates through and around the human head and body of the user without significant losses in the tissue. The first antenna configured for magnetic induction communication operating in the range of frequencies can be susceptible to electro-magnetic interference, such as noise, originating from the electric components.

The second antenna may be configured for communication in a frequency band in the GHz range. The second antenna may comprise a shielding part configured to shield the first antenna. The second antenna may be configured for communication in a frequency band in the GHz range, such as in the 5 GHz range, such as in the 2.4 GHz range, such as in the 2.1 GHz range. The second antenna may be configured for communication in the frequency band corresponding to the communication system used by the hearing device. In other words, the second antenna may be configured for communication in different frequency bands depending on the communication system used. The second antenna may be seen as a shielding antenna, e.g. configured to shield the first antenna.

In one or more example hearing devices, the shielding part is configured to shield the first antenna from electromagnetic interference from one or more electronic components comprised in the hearing device, such as the first electronic component of the hearing device. The one or more electronic components may comprise a second electronic component, and optionally a third electronic component. For example, the one or more electronic components (such as the first electronic component, and/or the second electronic component, and/or the third electronic component) can include one or more of: a power converter, a power management unit, a receiver, and a battery. For example, the first electronic component can be a power management unit of the hearing device.

In one or more example hearing devices, the shielding part extends along the first antenna axis.

In one or more example hearing devices, the shielding part extends along a shielding axis. In one or more example hearing devices, an angle between the shielding axis and the first antenna axis is less than 20 degrees. For example, the shielding part has a lengthwise extension parallel to the first antenna axis +/−20 degrees.

In one or more example hearing devices, the first antenna has a first length in the direction of the first antenna axis. In one or more example hearing devices, a shielding length of the shielding part is at least 75% of the first length.

In one or more example hearing devices, the shielding part is arranged at a shielding distance from the first antenna. For example, the shielding distance is less than 3 mm.

In one or more example hearing devices, the shielding part is curved and/or bent around the first antenna axis. For example, the shielding part may be formed as a cylinder cut-out. For example the shielding part can be co-centric with the first axis.

In one or more example hearing devices, the shielding part is flat. In one or more examples, the shielding part is in form of a comb. In one or more examples, the shielding part is in form of a half circle.

In one or more example hearing devices, the shielding part has an angular extension around the first antenna axis. In one or more example hearing devices, the angular extension is at least 45 degrees, preferably at least 90 degrees. The angular extension may be seen as a width of the shielding part.

In one or more example hearing devices, the shielding part extends from a first end to a second end along the shielding axis. In one or more example hearing devices, the shielding axis is configured to form an angle less than 30 degrees with an ear-to-ear axis of the user, e.g. when the hearing device is arranged in or at the ear of the user. For example, the first antenna axis forms an angle less than 30 degrees with an ear-to-ear axis of the user when the hearing device is arranged in or at the ear of the user.

In one or more example hearing devices, the second antenna comprises a first part and a second part. In one or more example hearing devices, the first part and the second part may be electrically connected to each other. In one or more example hearing devices, the shielding part may be electrically connected to the second part. For example, the first part has a first normal, and the second part has a second normal. For example, the first normal and the second normal may form angle of 75 to 105 degrees. In one or more example hearing device, the first part may be planar. In one or more example hearing device, the second part may be planar. For example, the second part may form part of a top printed circuit board, PCB. For example, the second part has a cut and/or a slit.

In one or more example hearing devices, the second part has a second primary cut extending along a cut axis. In one or more example hearing devices, the cut axis may form an angle with the first antenna axis in the range from 75 degrees to 105 degrees.

In one or more example hearing devices, the second antenna has a first intermediate cut between the first part and the second part. For example, the second antenna may have the first cut intermediate forming connections parts between the first part and the second part.

In one or more example hearing devices, the second antenna comprises a printed circuit board, PCB, with one or more inner surfaces. The PCB may be a foldable PCB, such as a flexible PCB. For example, the second antenna may comprise a folded PCB. For example, one or more ground layers of the printed circuit board may be arranged between the first part and the second part so that resonance defining the second antenna is provided. The first part of the second antenna may be seen as a ground plane. The second part may be seen as the main radiator. In one or more examples, signals (such as all the signals) from the first part to the second part may be decoupled to avoid any dead resonance, such as resonance that is not needed and/or that is seen as interference. For example, the PCB may be coated by copper wherein a cut on the ground plane forms the second antenna on the PCB surface. The second antenna may be an inverted L-shape antenna and/or a C-shape antenna, for example depending on an architecture of an antenna assembly.

In one or more example hearing devices, the first electronic component is mounted on an inner surface of the printed circuit board. For example, the first electronic component may be a power management unit.

In one or more example hearing devices, one or more electronic components are mounted on the first part of second antenna (e.g. serving as ground plane). For example, the one or more electronic components mounted on the first part of second antenna comprises one or more of: a transducer, a signal processor (such as a signal processor configured to process an input signal and providing an output signal, such as an output sound signal), a transmission and/or reception circuit for transmission and/or reception of electro-magnetic energy for the first antenna and the second antenna.

In one or more example hearing devices, the second electronic component is mounted on an inner surface of the printed circuit board. For example, when the second electronic component is a receiver, the second electronic component is mounted in an ear canal part of the hearing device (such as in a shell and/or a shell frame, and/or in an ear canal part of a housing of the hearing device). For example, the receiver is coupled (e.g. soldered) to the first part of the second antenna, e.g. via wires. For example, the receiver is mounted with a suspension on the ear shell.

In one or more example hearing devices, a first conductor connects the first antenna and the first part of the second antenna. For example, the first conductor may be integrated in the PCB. In one or more example hearing devices, the first conductor may be a floating wire inside the housing or the shell of the hearing device.

In one or more example hearing devices, the hearing device comprises a charging coil mounted on an outer surface of the printed circuit board. For example, the hearing device comprises a charging coil mounted on a second outer surface of the second part of the second antenna.

FIG. 1 schematically illustrates a phantom head model of a user, and a three dimensional coordinate system with an x, y, and z axis.

When designing antennas for wireless communication proximate the human body, the human head can be approximated by a rounded enclosure, such as enclosure 3. FIG. 1 shows a rounded enclosure 3 including sensory organs, such as the nose, ears, mouth and eyes attached thereto. The rounded enclosure 3 may be seen as illustrating the phantom head model from the front together with a three dimensional coordinate system with an x, y and z axis for defining orientations with relation to the head.

The phantom head may model a user that is standing erect on the ground where the ground plane is parallel to xy-plane.

A point of the surface of the phantom head model (such as a point of the surface of the head of a user) has a normal vector and a tangential vector. The normal vector is orthogonal to the surface of the head. The tangential vector is parallel to the surface of the head. An element and/or a plane extending along the surface of the head is said to be parallel to the surface of the head. An element and/or a plane extending from a point on the surface of the head and radially outward from the head into the surrounding space is said to be orthogonal to the surface of head.

Point 2 of FIG. 1 has tangential vectors parallel to the yz-plane of the coordinate system, and a normal vector parallel to the x-axis. In other words, the y-axis and z-axis are parallel to the surface of the head at the point 2 and the x-axis is orthogonal to the surface of the head at the point 2.

In FIG. 1, the axis going through the right ear canal and the left ear canal (such as, an ear to ear axis and/or an ear axis) is parallel to the x-axis. The ear to ear axis is thus orthogonal to the surface of the head at the points where it leaves the surface of the head. The ear to ear axis as well as the surface of the head are used as reference when describing specific configurations of the elements in one or more embodiments.

Since the auricle of the ear is primarily located in the plane parallel to the surface of the head on most test persons, it is often described that the ear to ear axis also functions as the normal to the ear. Even though there will be variations from person to person as to how the plane of the auricle is oriented.

The in the ear canal type of hearing aid have an elongated housing shaped to fit in the ear canal. The longitudinal axis of in the ear canal type of hearing aid is then parallel to the ear to ear axis, whereas the face plate of in the ear canal type of hearing aid is in a plane orthogonal to the ear axis. The behind the ear type of hearing aid has an elongated housing most often shaped as a banana to rest on top of the auricle of the ear. The housing of behind the ear type of hearing aid has a longitudinal axis parallel to the surface of the head of the user.

Figure 2:
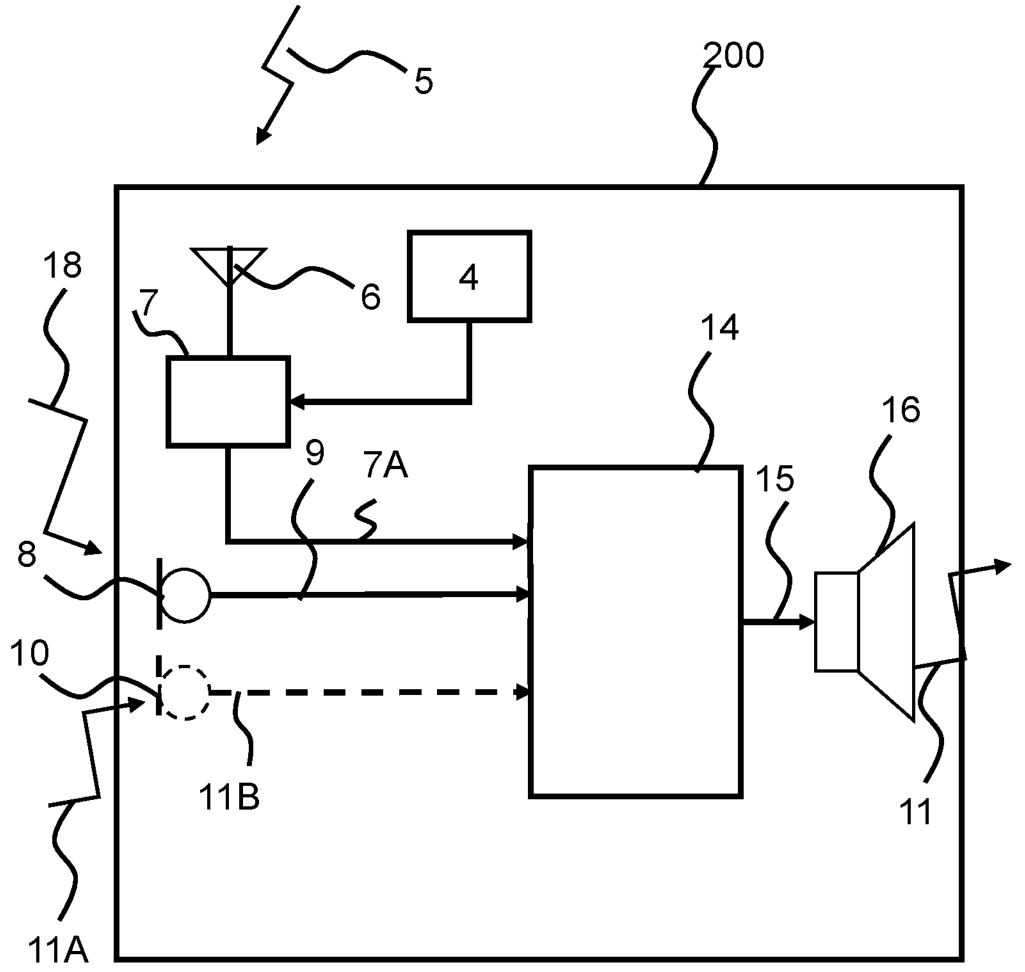
FIG. 2 is a block diagram of an exemplary hearing device according to the disclosure.

FIG. 2 is a block diagram of an exemplary hearing device according to the disclosure.

The hearing device 200 comprises a receiver 16 for transmission of an output signal 15. The receiver is configured to convert the output signal 15 into an audio output signal 11. The hearing device 200 comprises a set of microphones. The set of microphones comprises a first microphone 8, such as a microphone configured to receive sounds from the environment outside the hearing device, such as facing the surroundings of the user. For example, the first microphone 8 may obtain an input signal based a received audio signal 18 and may provide the input signal 9 to other modules of the hearing device 200.

The set of microphones comprises optionally a second microphone 10, such as an ear canal microphone for obtaining an ear canal microphone input signal 11B, which is based on the audio signal 11A as received from a receiver 16.

In other words, the second microphone 10 may be configured to measure the audio signal 11A because the second microphone 10 receives the audio signal 11A from the receiver 16, which is then passed on as an ear canal microphone input signal 11B. The audio output signal 11 is based on the output signal 15 provided by the processor 14.

The hearing device 200 may comprise an ear canal part and another part towards the opening of the ear. In one or more exemplary hearing devices, the second microphone 10 is positioned in the ear canal part of the hearing device 200, i.e. the part facing the ear drum or tympanic membrane) and the first microphone 8 is positioned on the part of the hearing device 200 that faces the opening of the ear (capturing the environment).

The hearing device 200 comprises a processor 14 for processing input signals and providing an output signal 15. The processor 14 may be connected to the transceiver 7 and/or the microphone 8, 10 for receiving and processing signals. The processor 14 is configured to compensate for a hearing loss of a user and to provide an output signal 15.

The second microphone 10 may be configured to provide ear microphone input signal 11B to the processor 14.

Figure 3:
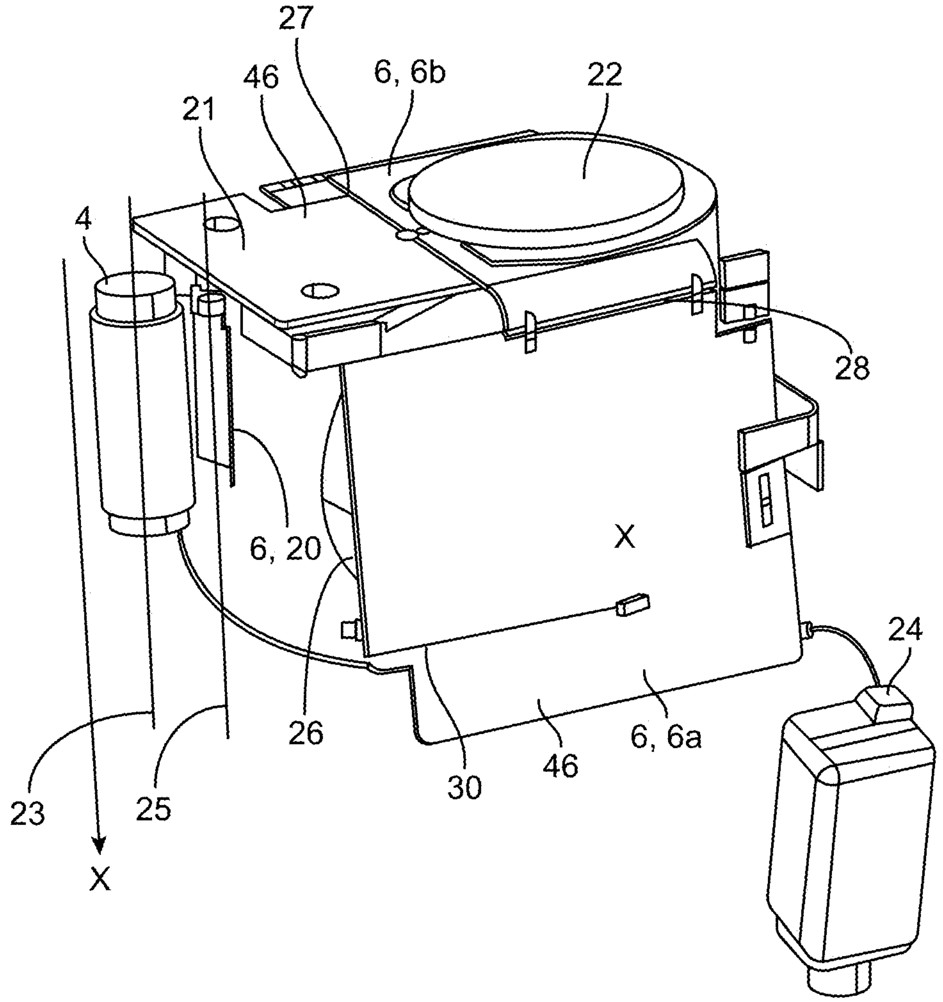
FIG. 3 is a perspective view illustrating exemplary parts of a hearing device according to this disclosure.

The hearing device 200 comprises a first antenna 4 configured for magnetic induction communication. The first antenna 4 may comprise a coil part, e.g. coiled along a first antenna axis, as illustrated in FIG. 3.

The hearing device 200 may comprise a second antenna 6 for for communication in a frequency band in the GHz range. The first antenna 4 may be configured to converting a first wireless input signal 5 of a first external source (not shown in FIG. 2) to an antenna output signal. The second antenna 6 may be configured to converting a first wireless input signal 5 of a first external source (not shown in FIG. 2) to an antenna output signal.

The hearing device 200 may comprise a transceiver 7 for provision of a transceiver input signal 7A, which may comprise a radio transceiver coupled to the first antenna 4 and/or the second antenna 6 for converting the antenna output signal to one or more transceiver input signals.

A receiver 16 is configured to transmit an output signal 15 as an audio output signal 11 to be directed towards an eardrum of the hearing device user.

FIG. 3 is a perspective view illustrating exemplary parts of an exemplary hearing device according to this disclosure. FIG. 3 shows a first antenna 4 configured for magnetic induction communication and a second antenna 6 configured for communication in a frequency band in the GHz range.

FIG. 3 shows a shielding part 20 configured to shield the first antenna 4, e.g. from electro-magnetic interference from an electronic component of the hearing device, such as a power management unit. FIG. 3 shows a charging coil 22 (such as Rx coil), a battery 26 and a receiver 24. For example, the power management unit may comprise the charging coil 22 and the battery 26. In FIG. 3, the power management unit is placed on the inner surface of second antenna 6.

The second antenna 6 comprises the shielding part 20.

In one or more example hearing devices, the shielding part 20 extends along the first antenna axis 23. For example, the shielding part 20 extends along a shielding axis 25. In one or more example hearing devices, an angle between the shielding axis 25 and the first antenna axis 23 is less than 20 degrees. For example, the shielding part 20 has a lengthwise extension parallel to the first antenna axis 23, with +/−20 degrees.

For example, the first antenna 4 has a first length in the direction of the first antenna axis 23. For example, a shielding length of the shielding part 20 is at least 75% of the first length. As illustrated in FIG. 3, the shielding part 20 is arranged at a shielding distance from the first antenna 4. For example, the shielding distance is less than 3 mm.

As illustrated in FIG. 3, the shielding part 20 can be curved and/or bent around the first antenna axis 23. For example, the shielding part 20 has an angular extension around the first antenna axis 23. For example, the angular extension is at least 45 degrees, preferably at least 90 degrees. The angular extension may provide a width of the shielding part 20.

In one or more example hearing devices, the shielding part 20 extends from a first end to a second end along the shielding axis 25. For example, the shielding axis 25 is configured to form an angle less than 30 degrees with an ear-to-ear axis of the user (such as in the x-direction of FIG. 1, 4), e.g. when the hearing device is arranged in or at the ear of the user. For example, the first antenna axis 23 forms an angle less than 30 degrees with an ear-to-ear axis of the user when the hearing device is arranged in or at the ear of the user.

In FIG. 3, the second antenna 6 comprises a first part **6*a* and a second part 6*b*. For example, the first part 6*a* and the second part 6*b* may be electrically connected to each other. For example, the shielding part 20 may be operatively connected and/or operatively coupled to the second part 6*b*. For example, the shielding part 20 may be electrically connected (or disconnected) to the second part 6*b*, such as via 21 which may be seen as a third part of the second antenna 6 and/or an extension of the second antenna 6. The shielding part 20 and 21** may be connected via a shield tuning element.

For example, the first part **6*a* has a first normal, and the second part 6*b*** has a second normal. For example, the first normal and the second normal may form angle of 75 to 105 degrees.

For example, the first part **6*a* may be planar. For example, the second part 6*b* may be planar. For example, the second part 6*b* may form part of a top part of a printed circuit board, PCB 46. For example, the second part 6*b* has a cut 27 and/or a slit. For example, the first part 6*a* may form part of another part of the printed circuit board, PCB 46**.

In one or more example hearing devices, the second part **6*b* has a second primary cut 27 extending along a cut axis. Optionally, the cut axis may form an angle with the first antenna axis 23** in the range from 75 degrees to 105 degrees.

For example, the second antenna 6 has a first intermediate cut 28 between the first part **6*a* and the second part 6*b*. For example, the second antenna 6 may have the first intermediate cut 28 forming connections parts between the first part 6*a* and the second part 6*b*. The connection parts may be seen as antenna feeds for the second antenna 6**.

For example, the second antenna 6 may comprise and/or formed with decoupling components to decoupling signal from the first part **6*a* of the second antenna 6 to the second part 6*b* of the second antenna 6**.

In one or more example hearing devices, the second antenna 6 comprises a printed circuit board, PCB, with one or more inner surfaces. The PCB may be a foldable PCB, such as a flexible PCB. For example, the second antenna 6 may comprise a folded PCB. For example, one or more ground layers of the printed circuit board may be arranged between the first part 6*a* and the second part 6*b* so that resonance defining the second antenna 6 is provided. The first part 6*a* of the second antenna 6 may serve as a ground plane. The second part 6*b* may be seen as the main radiator.

In one or more example hearing devices, the first electronic component, such as component 26, is mounted on an inner surface of the printed circuit board. For example, the first electronic component may be a power management unit, such as battery 26.

In one or more example hearing devices, one or more electronic components are mounted on the first part 6*a* of second antenna 6 (e.g. serving as ground plane). For example, the one or more electronic components mounted on the first part 6*a* of second antenna 6 comprises a transmission and/or reception circuit (such as charging coil 22) for transmission and/or reception of electro-magnetic energy for the first antenna 4 and the second antenna 6.

In one or more example hearing devices, the second electronic component is mounted on an inner surface of the printed circuit board. For example, when the second electronic component is a receiver 24, the second electronic component is mounted in an ear canal part of the hearing device (such as in a shell and/or a shell frame, and/or in an ear canal part of a housing of the hearing device). For example, the receiver 24 is coupled (e.g. soldered) to the first part 6*a* of the second antenna 6, e.g. via wires. For example, the receiver 24 is mounted with a suspension on the ear shell.

In one or more example hearing devices, a first conductor 30 connects the first antenna 4 and the first part 6*a* of the second antenna 6. For example, the first conductor 30 may be integrated in the PCB. In one or more example hearing devices, the first conductor 30 may be a floating wire inside the housing or the shell of the hearing device.

In one or more example hearing devices, the hearing device comprises a charging coil 22 mounted on an outer surface of the printed circuit board forming 6*a* and 6*b*. For example, the hearing device comprises a charging coil 22 mounted on a second outer surface of the second part 6*b* of the second antenna 6.

In general, various parts of the first antenna 4 and/or of the second antenna 6 can be formed with many different geometries (such as, wires or patches, bend or straight, long or short) as long as the shielding part 20 follows the disclosed configuration with respect to first antenna 4 and the second antenna 6.

Figure 4:
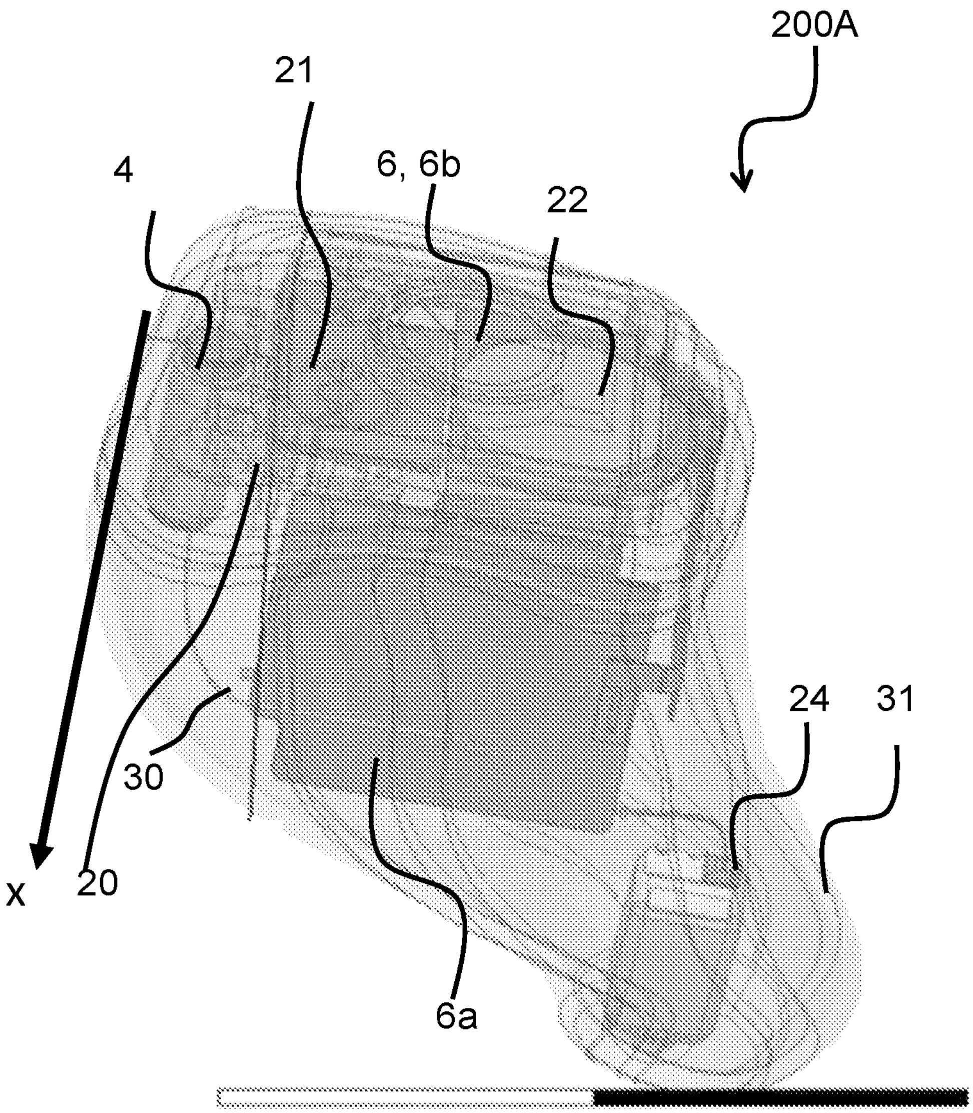
FIG. 4 is a perspective view illustrating exemplary parts of a hearing device according to this disclosure.

FIG. 4 is a perspective view illustrating exemplary parts of an exemplary hearing device according to this disclosure. FIG. 4 shows a housing 31 of the example hearing device 200A being an ITE hearing device (such as an ITE hearing aid) and an x-axis in the same direction as the x-axis of FIG. 1. The hearing device 200A comprises a first antenna 4 configured for magnetic induction communication and a second antenna 6 configured for communication in a frequency band in the GHz range.

The hearing device 200A comprises a shielding part 20 configured to shield the first antenna 4, e.g. from electromagnetic interference from an electronic component of the hearing device, such as a power management unit. FIG. 4 shows a charging coil 22 (such as Rx coil), and a receiver 24.

In FIG. 4, the second antenna 6 comprises a first part 6*a* and a second part 6*b*. For example, the first part 6*a* and the second part 6*b* may be electrically connected to each other. For example, the shielding part 20 may be electrically connected to the second part 6*b*, such as via 21 which may be seen as a third part of the second antenna 6 and/or an extension of the second antenna 6.

The hearing device 200A comprises a first conductor 30 that connects the first antenna 4 and the first part 6*a* of the second antenna 6.

FIGS. 3 and 4 may be seen from the front of the head of a user (such as from the tragus part of the ear of the user).

Figure 5:
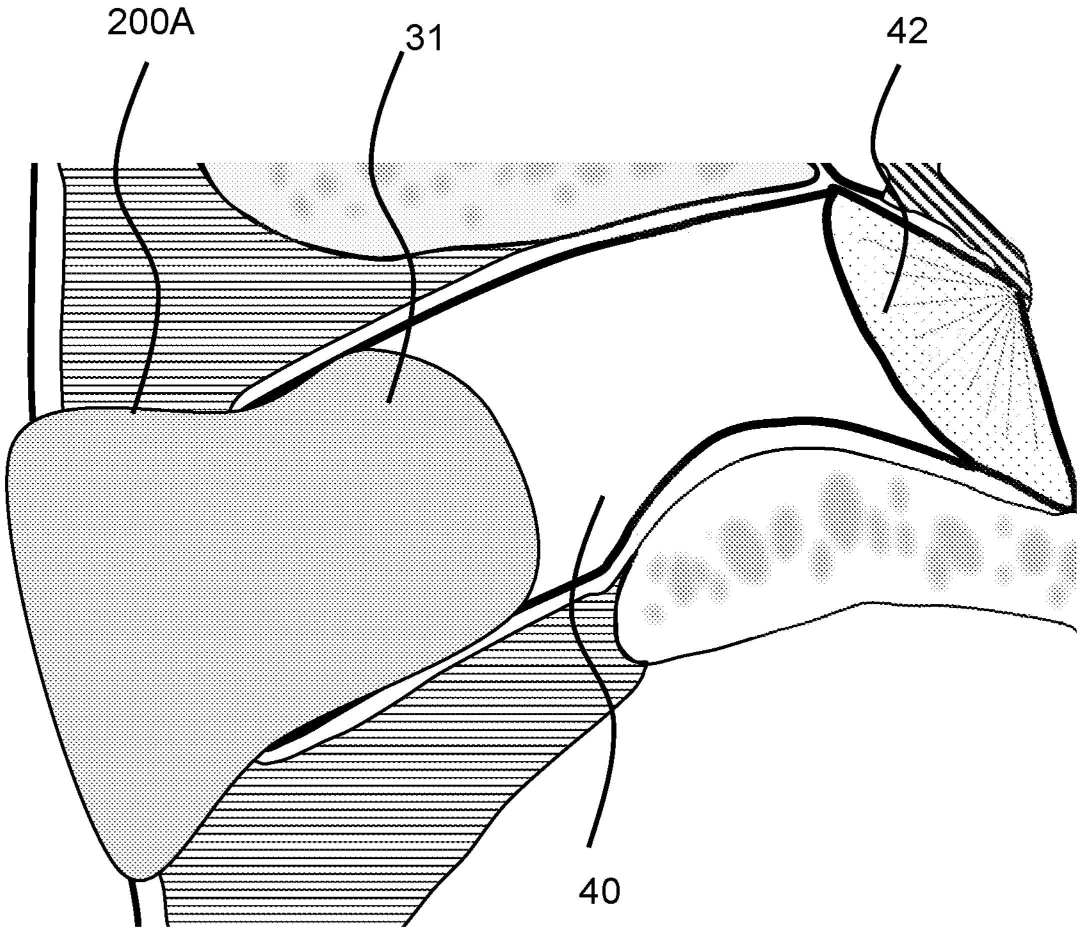
FIG. 5 is a schematic diagram illustrating an exemplary hearing device in the ear canal of a user, according to this disclosure.

FIG. 5 is a cross-section of a user's ear having an exemplary hearing device 200A partly inserted in the ear canal 40 of the ear according to the disclosure. The ear canal 40 leads to the ear drum or tympanic membrane 42. The hearing device 200A is an in-the-ear hearing device. The hearing device 200A comprises a housing 31.

Figure 6:
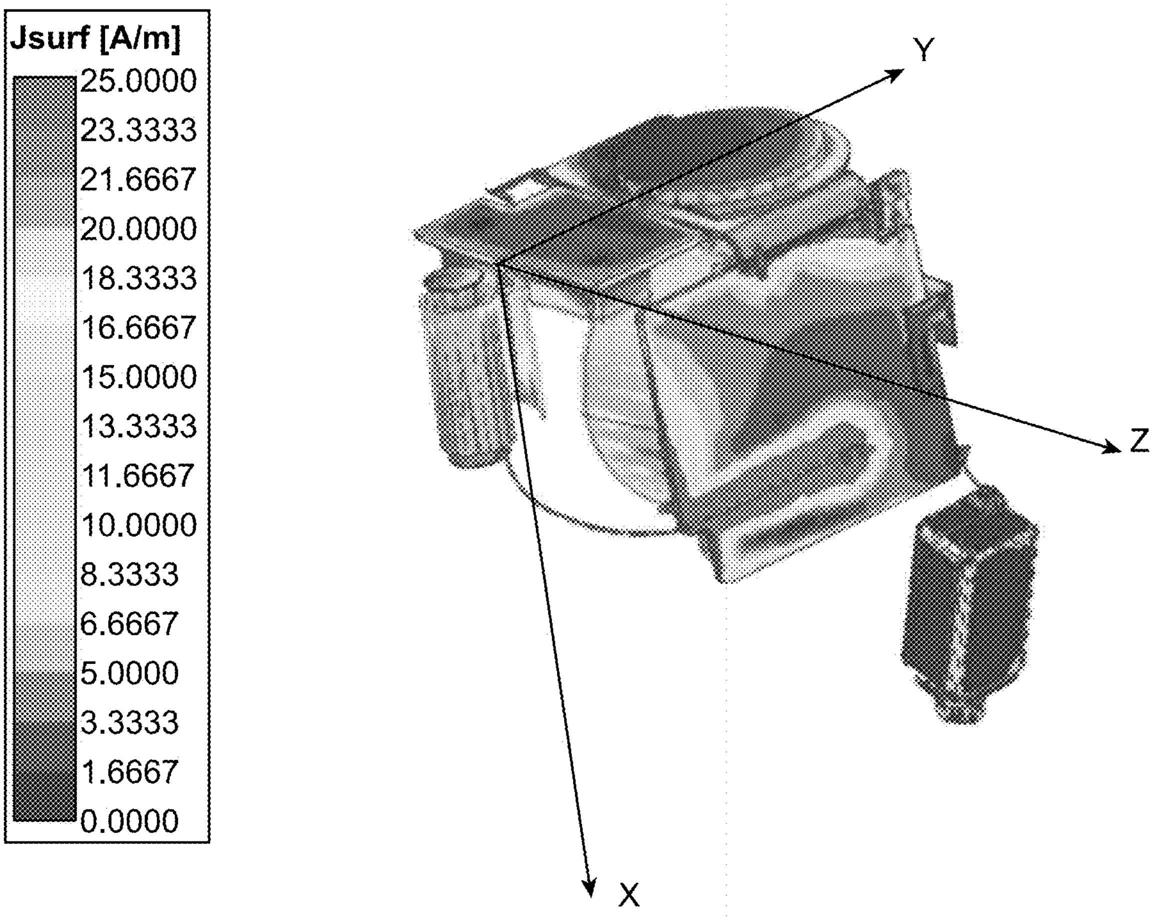
FIG. 6 is a graph illustrating the electro-magnetic interference caused without a shielding part disclosed herein.

FIG. 6 shows the electro-magnetic interference caused when the shielding part disclosed herein is disconnected, in other words without a shielding part disclosed herein. FIG. 6 shows the magnetic field strength in A/m as the magnetic field radiates through parts of the hearing device, that correspond to parts of the hearing device illustrated in FIG. 3.

FIG. 6 shows that the first antenna for magnetic induction communication receives a magnetic field with a magnetic field strength around 25 A/m.

Figure 7:
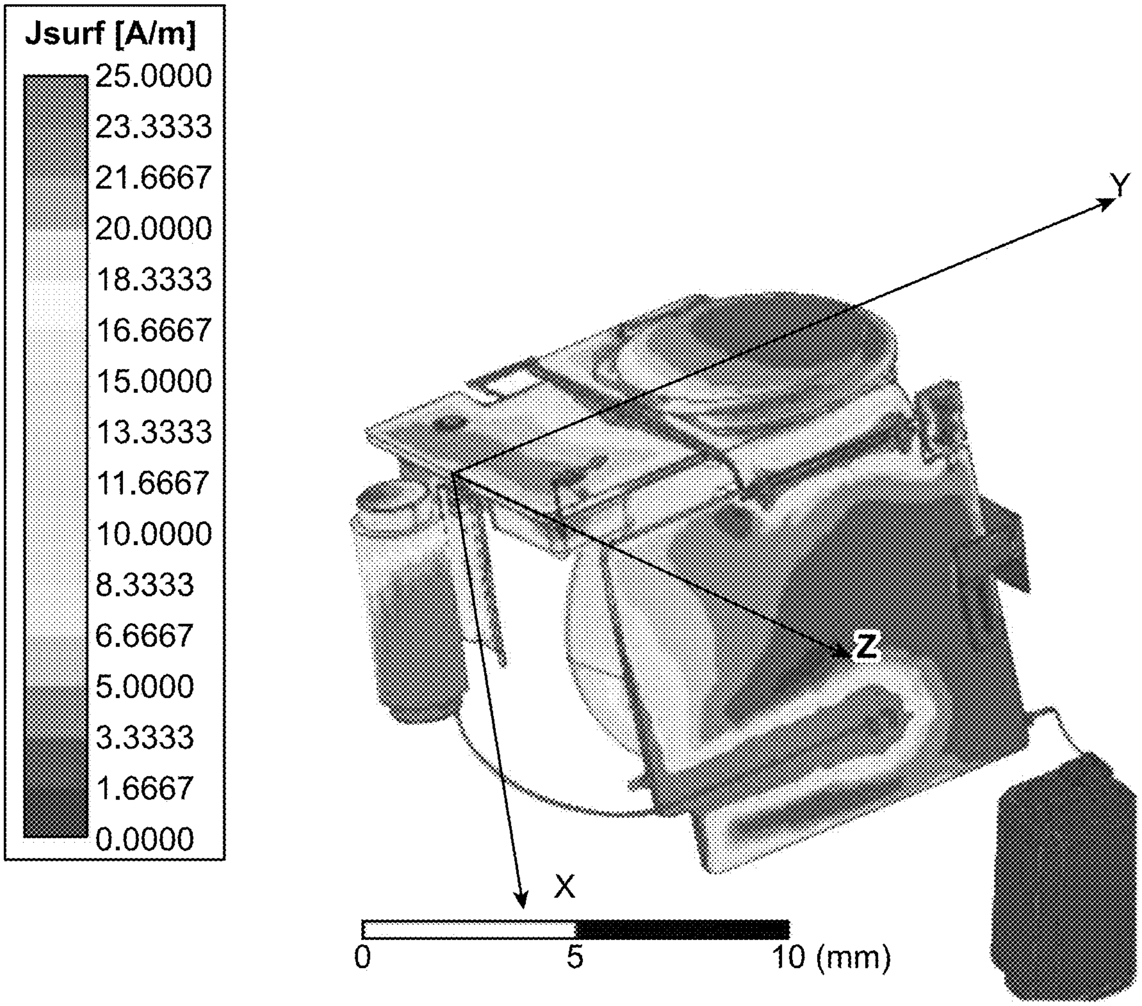
FIG. 7 is a graph illustrating the electro-magnetic interference when a shielding part disclosed herein is used in the hearing device.

FIG. 7 shows the electro-magnetic interference when the shielding part disclosed herein is used. FIG. 7 shows the magnetic field strength in A/m as the magnetic field radiates through parts of the hearing device, that correspond to parts of the hearing device illustrated in FIG. 3.

FIG. 7 shows that the first antenna for magnetic induction communication receives a magnetic field with a magnetic field strength around 10 A/m in average. FIG. 7 shows that the second antenna receives a larger magnetic field than in FIG. 6.

Figure 8:
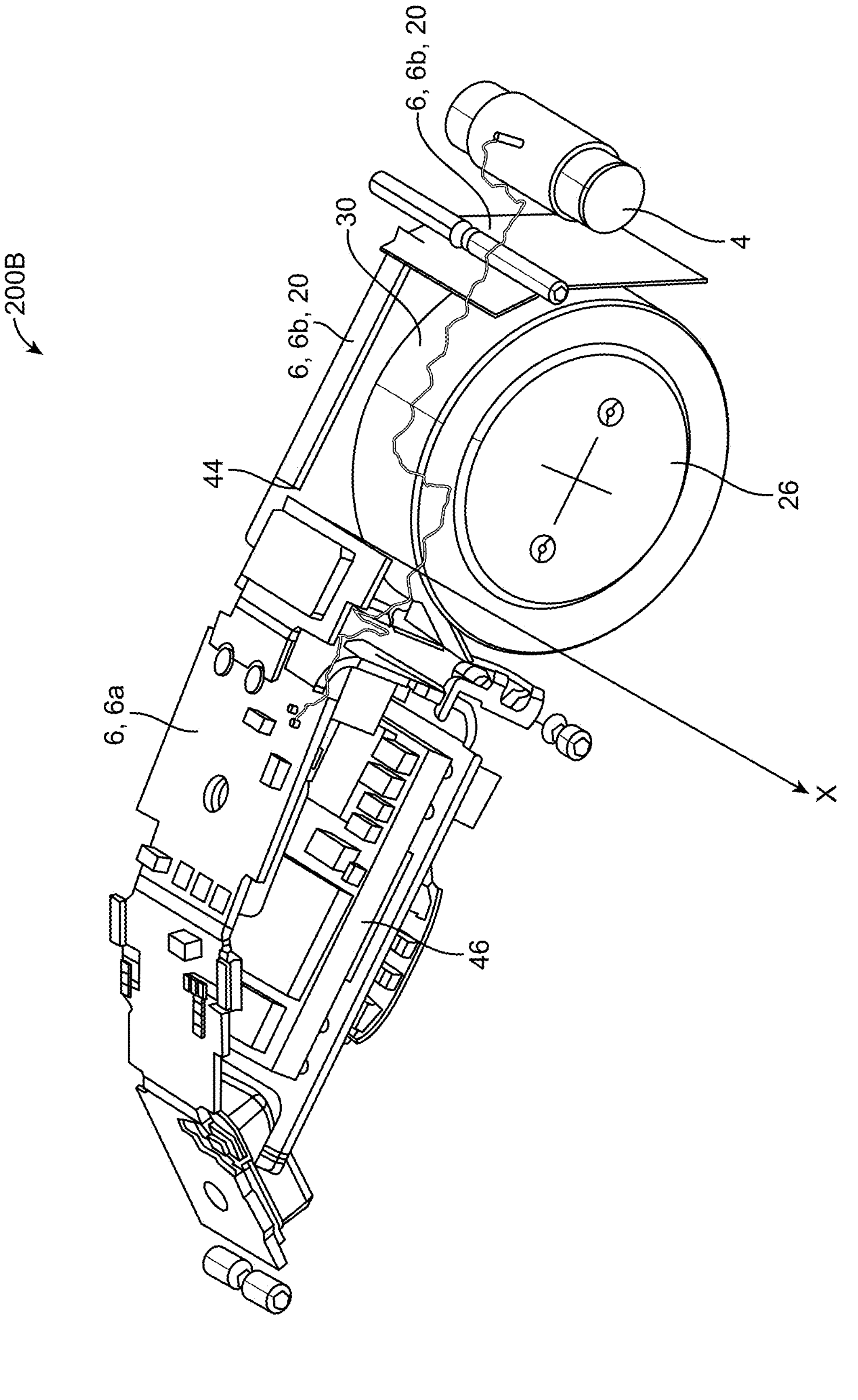
FIG. 8 is a perspective view illustrating exemplary parts of a hearing device according to this disclosure.

FIG. 8 is a perspective view illustrating exemplary parts of an exemplary hearing device according to this disclosure. FIG. 8 shows an example hearing device 200B being an BTE hearing device (such as an BTE hearing aid, for example to be worn on a right ear of a user) and an x-axis in the same direction as the x-axis of FIG. 1. The hearing device 200B comprises a first antenna 4 configured for magnetic induction communication and a second antenna 6 configured for communication in a frequency band in the GHz range.

The hearing device 200B comprises a shielding part 20 configured to shield the first antenna 4, e.g. from electromagnetic interference from an electronic component of the hearing device, such as a power management unit, such as battery 26. The second antenna 6 comprises the shielding part 20 and an antenna feed 44.

In FIG. 8, the second antenna 6 comprises a first part 6*a* and a second part 6*b*. For example, the first part 6*a* and the second part 6*b* may be electrically connected to each other. For example, the shielding part 20 may be electrically connected to the second part 6*b*.

The hearing device 200A comprises a first conductor 30 that connects the first antenna 4 and the first part 6*a* of the second antenna 6.

Figure 9A:
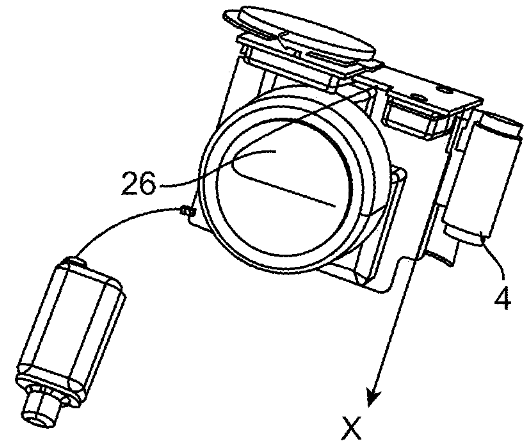
FIGS. 9A-9C are respectively a back perspective view, a top perspective view, and a perspective view from below illustrating respectively exemplary parts of a hearing device according to this disclosure.
Figure 9B:
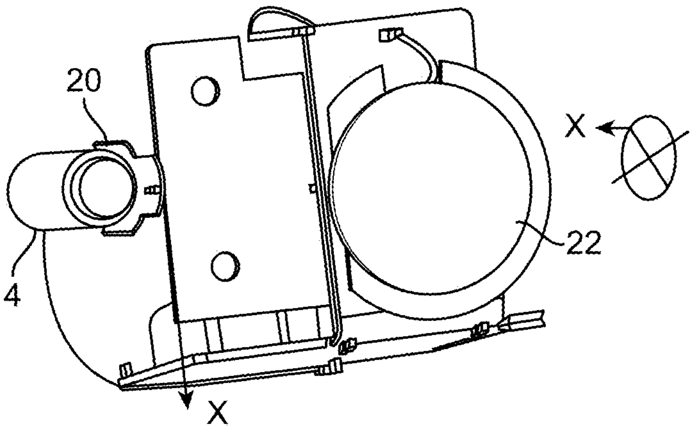
Figure 9C:
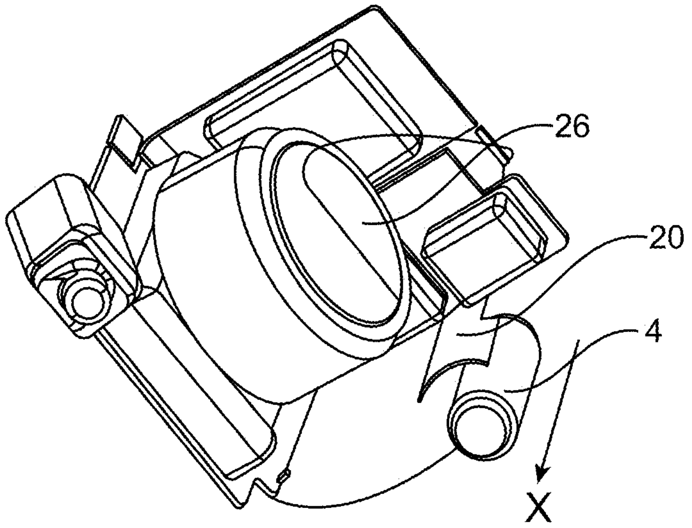

FIGS. 9A-9C are respectively back perspective view, a top perspective view, and a perspective view from below illustrating respectively exemplary parts of a hearing device according to this disclosure.

FIG. 9A shows a back perspective view, illustrating exemplary parts of a hearing device according to this disclosure. In FIG. 9A, the hearing device of FIG. 3 is shown from the back direction, to illustrate example parts underneath the top part of the PCB, such as battery 26. FIG. 9A shows the first antenna 4 and the x-axis of FIG. 3.

FIG. 9A may be seen as showing the hearing device from the back of the head of a user.

FIG. 9B may be seen as showing the hearing device from the pinna of a user.

FIG. 9B shows a top perspective view illustrating exemplary parts of a hearing device according to this disclosure. In FIG. 9B, the hearing device of FIG. 3 is shown from the top, to illustrate example parts on top the PCB, such as the charging coil 22. FIG. 9B shows the first antenna 4, the shielding part 20 and the x-axis of FIG. 3.

FIG. 9C shows a perspective view from below illustrating exemplary parts of a hearing device according to this disclosure. In FIG. 9C, the hearing device of FIG. 3 is shown from below the receiver 24, to illustrate example parts below the PCB, such as the battery 26. FIG. 9C shows the first antenna 4, the shielding part 20 and the x-axis of FIG. 3.

FIG. 9C may be seen as showing the hearing device from inside the ear canal.

The use of the terms “first”, “second”, “third” and “fourth”, “primary”, “secondary”, “tertiary” etc. does not imply any particular order, but are included to identify individual elements. Moreover, the use of the terms “first”, “second”, “third” and “fourth”, “primary”, “secondary”, “tertiary” etc. does not denote any order or importance, but rather the terms “first”, “second”, “third” and “fourth”, “primary”, “secondary”, “tertiary” etc. are used to distinguish one element from another. Note that the words “first”, “second”, “third” and “fourth”, “primary”, “secondary”, “tertiary” etc. are used here and elsewhere for labelling purposes only and are not intended to denote any specific spatial or temporal ordering.

Furthermore, the labelling of a first element does not imply the presence of a second element and vice versa.

It may be appreciated that the figures comprise some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word “comprising” does not necessarily exclude the presence of other elements or steps than those listed.

It is to be noted that the words “a” or “an” preceding an element do not exclude the presence of a plurality of such elements.

It should further be noted that any reference signs do not limit the scope of the claims, that the exemplary embodiments may be implemented at least in part by means of both hardware and software, and that several “means”, “units” or “devices” may be represented by the same item of hardware.

The various exemplary methods, devices, and systems described herein are described in the general context of method steps processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

LIST OF REFERENCES

2 point
3 rounded enclosure
200 hearing device
200A hearing device
200B hearing device
4 first antenna
5 first wireless input signal
6 second antenna
6*a* first part
6*b* second part
7 transceiver
7A transceiver input signal
8 first microphone
9 external input signal from external microphone
10 second microphone
11 audio output signal emitted by the receiver
11A audio signal received as input at the ear canal microphone
11B ear canal microphone input signal
14 processor
15 output signal
16 receiver
18 audio signal obtained at the external microphone
20 shielding part
21 third part
22 charging coil
23 first antenna axis
24 receiver
25 shielding axis
26 battery
27 second primary cut
28 first intermediate cut
30 first conductor
31 housing
40 ear canal
42 ear drum or tympanic membrane
44 antenna feed
46 PCB

The invention claimed is:

1. A hearing device comprising:

a plurality of antennas; and electronic components including a first electronic component;

wherein the plurality of antennas comprises a first antenna and a second antenna, wherein the first antenna comprises a coil part coiled along a first antenna axis and is configured for magnetic induction communication; and wherein the second antenna is configured for communication in a frequency band in a GHz range, wherein the second antenna comprises a shielding part configured to shield the first antenna.

2. The hearing device according to claim 1, wherein the shielding part is configured to shield the first antenna from electro-magnetic interference from the first electronic component of the hearing device.

3. The hearing device according to claim 1, wherein the shielding part extends along the first antenna axis.

4. The hearing device according to claim 1, wherein the shielding part extends along a shielding axis, wherein an angle between the shielding axis and the first antenna axis is less than 20 degrees.

5. The hearing device according to claim 1, wherein the first antenna has a first length in a direction of the first antenna axis, and wherein a shielding length of the shielding part is at least 75% of the first length.

6. The hearing device according to claim 1, wherein the shielding part is at a distance from the first antenna, the distance being less than 3 mm.

7. The hearing device according to claim 1, wherein the shielding part extends from a first end to a second end along a shielding axis, wherein the shielding axis forms an angle less than 30 degrees with an ear-to-ear axis of a user when the hearing device is arranged in or at an ear of the user.

8. The hearing device according to claim 1, wherein the second antenna comprises a printed circuit board, and wherein the first electronic component is mounted on a surface of the printed circuit board.

9. The hearing device according to claim 8, wherein the surface of the printed circuit board is an inner surface of the printed circuit board, and wherein the first electronic component is mounted on an inner surface of the printed circuit board.

10. The hearing device according to claim 9, further comprising a charging coil mounted on an outer surface of the printed circuit board.

11. A hearing device comprising:

a plurality of antennas; and electronic components including a first electronic component;

wherein the plurality of antennas comprises a first antenna and a second antenna, wherein the first antenna comprises a coil part coiled along a first antenna axis and is configured for magnetic induction communication;

wherein the second antenna is configured for communication in a frequency band in a GHz range, wherein the second antenna comprises a shielding part configured to shield the first antenna; and wherein the shielding part is curved and/or bent around the first antenna axis.

12. A hearing device comprising:

a plurality of antennas; and electronic components including a first electronic component;

wherein the plurality of antennas comprises a first antenna and a second antenna, wherein the first antenna comprises a coil part coiled along a first antenna axis and is configured for magnetic induction communication;

wherein the second antenna is configured for communication in a frequency band in a GHz range, wherein the second antenna comprises a shielding part configured to shield the first antenna; and wherein the shielding part has an angular extension around the first antenna axis, the angular extension being at least 45 degrees.

13. The hearing device according to claim 12, wherein the angular extension of the shielding part around the first antenna axis is at least 90 degrees.

14. A hearing device comprising:

a plurality of antennas; and electronic components including a first electronic component;

wherein the plurality of antennas comprises a first antenna and a second antenna, wherein the first antenna comprises a coil part coiled along a first antenna axis and is configured for magnetic induction communication;

wherein the second antenna is configured for communication in a frequency band in a GHz range, wherein the second antenna comprises a shielding part configured to shield the first antenna; and wherein the second antenna comprises a first part and a second part, the first part and the second part being electrically connected to each other, wherein the shielding part is electrically connected to the second part.

15. The hearing device according to claim 14, wherein the second part has a cut extending along a cut axis forming an angle with the first antenna axis, the angle being between 75° and 105°.

16. The hearing device according to claim 14, wherein the second antenna has a cut between the first part and the second part.

17. The hearing device according to claim 14, further comprising a first conductor connecting the first antenna and the first part of the second antenna.

* * * * *